United States Patent

Schumann et al.

[11] Patent Number: 5,563,209
[45] Date of Patent: Oct. 8, 1996

[54] PROCESS FOR THE REDUCTION OF CARBOXYL-END GROUPS OF LINEAR POLYESTERS

[75] Inventors: Heinz-Dieter Schumann, Maintal; Fritz Wilhelm, Karben; Rudolf Kaempf, Gruendau, all of Germany

[73] Assignee: Zimmer Aktiengesellschaft, Germany

[21] Appl. No.: 568,874

[22] Filed: Dec. 7, 1995

[30] Foreign Application Priority Data

Jul. 19, 1995 [DE] Germany ............ 195 26 405.3

[51] Int. Cl.$^6$ .................................... C08K 5/49
[52] U.S. Cl. ............... 524/709; 525/439; 524/115
[58] Field of Search ............... 525/437, 439; 524/115, 709

[56] References Cited

U.S. PATENT DOCUMENTS

| | | | |
|---|---|---|---|
| 4,064,112 | 12/1977 | Rothe et al. | 528/272 |
| 4,171,422 | 10/1979 | Lazarus et al. | 525/437 |
| 4,289,871 | 9/1981 | Rowan et al. | 528/309 |
| 4,348,314 | 9/1982 | Lazarus et al. | 525/439 |
| 4,374,960 | 2/1983 | Rothwell et al. | 525/436 |
| 4,374,961 | 2/1983 | Kudo et al. | 525/439 |
| 4,442,058 | 4/1984 | Griffith et al. | 264/176 |
| 4,867,936 | 9/1989 | Buyalos et al. | 264/210.6 |

*Primary Examiner*—Samuel A. Acquah
*Attorney, Agent, or Firm*—Banner & Allegretti, Ltd.

[57] ABSTRACT

A process for the reduction of the carboxyl end groups of linear polyester through reaction with alkylene carbonate in the melt phase in the presence of 40 to 160 ppm of allyltriphenyl phosphonium bromide, based on the weight of the polyester.

7 Claims, No Drawings

PROCESS FOR THE REDUCTION OF CARBOXYL-END GROUPS OF LINEAR POLYESTERS

BACKGROUND OF THE INVENTION

The invention relates to a process for the reduction of the carboxyl end groups of linear saturated polyesters by means of reaction with alkylene carbonate in the melt phase in the presence of a phosphonium catalyst.

Tough yarns for technical applications, such as cords for motor vehicle tires and conveyor belts, are manufactured from particularly high-molecular polyesters. Such high-molecular polyesters are produced through the post-condensation of precondensate, either in the solid phase (U.S. Pat. No. 4,064,112) or in the melt phase, in specially-designed reactor units (U.S. Pat. Nos. 3,728,083 and 5,055,273). The higher the carboxyl end group concentration of the prepolymer, however, the lower is its ability for post-condensation. A reduction of the carboxyl end groups preceding polycondensation, in order to increase the polycondensation ability, may thus be necessary in the production of particularly highmolecular polyesters.

The thermal stability of polyester drops sharply, not only with increasing temperature and residence time but also, most particularly, with increasing molecular weight, which leads to the breakdown of the molecular chains, and as a result to the formation of additional carboxyl end groups. Thus, the carboxyl end group concentration of the polyester discharged from the post-condensation reactor is usually over 20 meq/kg and, in the finished yarn, over 25 meq/kg. By means of particular equipment measures, values of approximately 16 meq/kg can be achieved in the yarn (U.S. Pat. No. 4,867,936). At the present time, however, the market requires yarns with less than 15 meq/kg and, if at all possible, less than 12 meq/kg, of the carboxyl end groups.

The prior art discloses reduction of the carboxyl end groups through the reaction of the polyester in the melt with different reagents, such as low-boiling oxiranes (U.S. Pat. No. 4,442,058), polycarbonates (U.S. Pat. No. 4,171,422), or alkylene carbonates (U.S. Pat. No. 4,348,314 and JP-B 48-041 713). Oxiranes, because of their low boiling point (under 75° C.), can only be homogeneously mixed into the polyester melts with difficulty and are, in addition, highly toxic. Polycarbonates can be handled well, but through the incorporation of polycarbonate units, lead however, to a disruption of the homogenous polyester structure and, as a result, to an impairment of the yarn characteristics, which can not be tolerated, particularly in HMLS yarns (high modulus, low shrinkage yarns). As catalysts, both tetra-(n-$C_{1-6}$-alkyl)-phosphonium acetates as well as -halogenides (U.S. Pat. No. 4,171,422) are suitable for this purpose. By supplying ethylene carbonate without a catalyst into the polyester-polycondensation reactor, the polycondensation reaction can be accelerated, but without, however, influencing the content of the carboxyl end groups (U.S. Pat. No. 4,289,871). The addition of a catalyst is necessary for the reduction of the carboxyl end groups. Equally well-suited for such purposes are organic phosphines and phosphonium hydroxides, halogenides or carboxylates, in which saturated alkyl groups and aryl groups are present as organic radicals, such as, for example, butyl triphenylphosphonium chloride (JP-B 48- 041713). Most of these alkyl- and/or arylphosphonium compounds are strongly hygroscopic and must be stored under nitrogen. At lower concentrations (below 200 ppm), a distinct reduction of the viscosity of the polyester appears and, at higher concentrations (400–500 ppm), in comparison with polyester without the addition of alkylene carbonate/catalyst, a yellow discoloration of the polyester additionally appears during the reaction of the polyester with alkylene carbonate. Alkali halogenides and alkali thiocyanates also show a good catalytic activity (U.S. Pat. No. 4,348,314). Alkali salts, however, promote the hydrolytic breakdown of the polyester, which can not be sufficiently compensated, particularly in respect to long-term stability, even through the addition of the phosphite- or phosphonate stabilizers (U.S. Pat. Nos. 4,374,960 or 4,374,961 ).

SUMMARY OF THE INVENTION

The object of the present invention is to provide a process, which can be carried out easily, for the reduction of the carboxyl end groups of linear polyester, in which the deterioration of the other characteristics of the polyester is prevented. More particularly, the object is to provide a catalyst, which is easy to handle, for the reaction of linear polyesters with alkylene carbonate in the melt, which, at the concentration which is necessary for a sufficient reduction of the carboxyl end groups of the polyester, changes the other characteristics of the polyester, particularly the thermal stability and the color, to the slightest extent possible.

These objects are accomplished by reacting the polyester with alkylene carbonate in the presence of 40 to 160 ppm of allyltriphenyl phosphonium bromide, based on the weight of the polyester.

Allyltriphenyl phosphonium bromide is non-hygroscopic, and is thus easy to handle and to store without a nitrogen atmosphere. Its high catalytic activity allows reactions at such low concentrations that no significant discoloration of the polyester comes about. The drop in the intrinsic viscosity of the polyester, which accompanies the catalytic reaction of the polyester with alkylene carbonate, was, surprisingly, lower during the use of allyltriphenyl phosphonium bromide than it was with the use of the phosphonium compounds which are listed in JP-B 48-041 713. All these listed compounds, without exception, contain alkyl groups which are saturated.

"Linear polyesters", as used in this specification, are homo- and co-polyesters of alkanediols and aryldicarboxylic acids. The preferred polyesters are: polyethylene terephthalate, polybutylene terephthalate and polyethylene naphthalate. Both polyester melts, which had been produced from the monomers immediately before, as well as those which were produced through the re-melting of polyester pellets, are used in the present process. The intrinsic viscosity of the polyester depends on its use and its further processing, and amounts, before the reaction with alkylene carbonate, to at least 0.15 dl/g, preferably at least 0.45 dl/g (measured at 25° C. in a solution of 0.5 g polyester in 100 ml of a mixture of 3 weight-parts of phenol and 2 weight-parts of 1,2-dichlorobenzene). The additives which are usual in the production and the processing of polyesters, such as transesterification—or esterification—and polycondensation catalysts, stabilizers, branching agents, colorants and pigments, can be present in the polyester and do not disturb the reaction with the alkylene carbonate.

Suitable alkylene carbonates are low-molecular, cyclic carbonates such as ethylene carbonate, propylene carbonate and butylene carbonate. Ethylene carbonate is preferred. The quantity of alkylene carbonate added to the polyester amounts to 0.5 to 1.5 weight %, and preferably 0.8 to 1.2 weight %.

The reaction of the polyester with the alkylene carbonate in the presence of the allyltriphenyl phosphonium bromide catalyst in accordance with the invention is carried out in the manner which is known per se. The catalyst is dissolved in the alkylene carbonate in a concentration (0.5 to 5 weight % based on the alkylene carbonate) which corresponds to the necessary catalyst quantity. This solution is then homogeneously mixed with the polyester melt under pressure. The pressure must be high enough to keep the alkylene carbonate at the temperature of the polyester melt in the liquid condition. Higher pressures, as occurring in the extrusion of the polyester, for example, 20 to 50 bar, are favorable. The mixing can take place with static mixing elements installed in the polyester melt supply pipe, such as, for example, with 8 to 24 SMX elements made by the firm Sulzer/CH. Other devices which enable a uniform distribution in the polyester melt are suitable. The mixing of the alkylene carbonate/catalyst into the polyester melt is preferably carried out in the supply pipe to the post-condensation reactor, but can also take place in the supply pipe to the polyester processing unit. The latter particularly comes into use if no post-condensation is provided in the melt phase. In this case, the quantity of alkylene carbonate is to be limited in such a manner that, under the given conditions, particularly the pressure, no large gas bubbles arise in the polymer melt, due to excess amounts of non-dissolved gaseous reaction by-products, mainly carbon dioxide. The feeding of the alkylene carbonate/catalyst takes place directly in front of the mixing section or, if a pellet melting extruder precedes the mixing section, also in the intake part of the extruder.

It is essential that the mixing section enables a total residence time from the ethylene carbonate/catalyst feed point to the exit from the mixing section of 2 to 12 min., preferably from 3 to 9 min., and particularly preferred from 4 to 6 min. This residence time is necessary in order to attain a sufficient reaction of the polyester with the alkylene carbonate to provide the desired reduction in the carboxyl end groups. With a longer residence time, a glycolytical and/or thermal depolymerization of the polyester, can result.

In place of the one-stage reaction, a two-stage reaction can be used, particularly if a very strong reduction of the carboxyl end groups is desired. In this case, one mixing section is connected each before and behind the melt phase post-condensation reactor.

With a one-stage reaction, the quantity of alkylene carbonate amounts to 0.5 to 1.5 weight %, preferably 0.6 to 1.2 weight %, and that of allyltriphenyl phosphonium bromide amounts to 40 to 120 ppm, preferably 60 to 100 ppm, each based on the polyester. With a two-stage reaction, the quantity of alkylene carbonate amounts to 0.5 to 1.2 weight %, preferably 0.6 to 1.0 weight %, during the first stage, and to 0.1 to 0.5 weight %, preferably up to 0.3 weight %, in the second stage, and that of allyltriphenyl phosphonium bromide amounts to 40 to 100 ppm, preferably 50 to 80 ppm in the first stage, and to 10 to 90 ppm, preferably 20 to 60 ppm, in the second stage, whereby the sum of the first and of the second stage is, at the maximum, equal to 160 ppm, each based on the polyester. The quantities stated are sufficient to provide the low carboxyl end group concentrations which are desired by the market. Additional measures are not necessary and, in particular, no additional catalysts of other chemical reactants are required.

SPECIFIC EXAMPLES

The characteristic values stated in the following examples were determined as follows:

Intrinsic viscosity (I.V.)

500 mg of polyester are dissolved in 100 ml of a mixture of phenol and 1,2-dichlorobenzene (3:2 weight parts), and the relative viscosity of this solution is determined at 25° C. in accordance with the method of Ubbelohde. The intrinsic viscosity is computed from the relative viscosity in accordance with Bilhneyer's equation.

Carboxyl end groups (COOH)

The polyester is dissolved during heating in a mixture of o-cresol and of chloroform (70:30 weight parts), and the content of —COOH groups is photometrically determined with 0.05 n of ethanolic potassium hydroxide against bromothymol blue.

b-Color value

The measurement is carried out on polyester pellets crystallized in a drying cabinet at 135±5° over the course of 1 hour. The color values are determined in a three-range color measuring device, whereby the color of the polyester sample is measured by means of three photocells, each of which with a red, green or blue filter (X-, Y- and Z-values). The evaluation is carried out in accordance with the method of Hunter, whereby:

$$b = (7.0 \div \sqrt{y}) \times (Y - 0.8467 \times Z).$$

Comparative Examples 1 to 9 and Example 10

Polyethylene terephthalate pellets with an intrinsic viscosity (I.V.) of 0.589 dl/g and 20 meq/kg of carboxyl end groups were, dried in usual manner, and then melted, in a single-screw extruder, Type LSM 30 made by the firm Leistritz/DE (screw diameter 30 mm, length 20 D, short-compression screw), at 270° C. and an initial pressure of approximately 35 bar. The melt is pumped with a gear pump at said temperature and initial pressure through a pipe (with an internal diameter of 27.3 mm) containing 12 mixer elements, type SMX from the firm Sulzer/CH. The mixing section closes at a circular aperture (nozzle diameter 1.1 mm) from which a single polymer strand is drawn off and pelletized. 0.9 weight % of ethylene carbonate (EC) containing the catalyst is dosed via the intake section of the extruder into the polyester melt. The catalyst concentration amounted to 72 ppm, based on the polyester. The residence time between the feeding point of the ethylene carbonate and the exit from the circular aperture nozzle was, in all cases, 8 min. The results which were thereafter measured on the pellets are summarized in the following:

|  |  | PET Pellets | | |
|---|---|---|---|---|
| Ex. No. | Catalyst | COOH/ meq/kg | I.V. dl/g | Δ I.V. |
| 1 | — | 31 | 0.581 | — |
| 2 | Tetraethyl phosphonium chloride | 1.5 | 0.540 | 0.041 |
| 3 | Tetraethyl phosphonium bromide | 1 | 0.539 | 0.042 |
| 4 | Tetraethyl phosphonium iodide | 1 | 0.536 | 0.045 |
| 5 | Tetrabutyl phosphonium chloride | 1 | 0.519 | 0.062 |
| 6 | Tetrabutyl phosphonium bromide | 1 | 0.499 | 0.082 |
| 7 | Tetraphenyl phosphonium bromide | 1 | 0.419 | 0.162 |
| 8 | Tetraphenyl phosphonium iodide | 1 | 0.467 | 0.114 |
| 9 | Butyltriphenyl phosphonium chloride | 1 | 0.534 | 0.047 |
| 10 | Allyltriphenyl phosphonium bromide | 2.5 | 0.580 | 0.001 |

As is evident above, allyltriphenyl phosphonium bromide, with the unsaturated allyl group, has a similar catalytic effect, but leads to a clearly lower reduction of the viscosity than the tested phosphonium compounds, having saturated alkyl groups and/or aryl groups.

Example 11 and Comparative Examples 12 to 13

Polyethylene terephthalate pellets having an intrinsic viscosity (I.V.) of 0.88 dl/g, and meq/kg of carboxyl end groups, were dried and subsequently melted in the same single-screw extruder as in examples 1 to 10 at 285° C. and an initial pressure of approximately 35 bar and, at this temperature and initial melt pressure pumped through the same pipe/mixing system as in examples 1 to 10, and again pressed out as a single strand and pelletized. Ethylene carbonate (EC) containing catalyst was dosed into the polyester melt directly in front of the mixing section. Allyltriphenyl phosphonium bromide (A) was used as the catalyst for example 11, and butyltriphenyl phosphonium chloride (B) was used for comparison in example 12. The residence time from the ethylene carbonate feeding point until discharge from the circular aperture nozzle totaled, in all cases, to 10 min. The results which were measured thereafter on the pellets are summarized in the following:

| Example Number | EC weight % | Catalyst Type | ppm | PET pellets I.V. dl/g | Δ I.V. | COOH meq/kg |
|---|---|---|---|---|---|---|
| 11 | 0.97 | A | 156 | 0.807 | 0.031 | 7 |
| 12 | 0.92 | B | 154 | 0.788 | 0.050 | 14 |
| 13 | — | — | — | 0.838 | — | 20 |

Under these conditions, the unsaturated allyltriphenyl phosphonium bromide, in comparison with the saturated butyltriphenyl phosphonium chloride, produces a stronger reduction of the —COOH groups at a simultaneously lower degradation of the viscosity.

Examples 14 to 16 and Comparative Example 17

Polyethylene pellets with an I.V. of 0.624 dl/g, 24 meq/kg carboxyl end groups, 1.16 weight % diethylene glycol and a b-color value of 2.3, and containing 240 ppm of antimony, and 18 ppm of phosphorus, were in the manner described under examples 1 to 10, reacted with ethylene carbonate containing catalyst. In contrast to examples 1 to 10, ethylene carbonate was already fed into the intake area of the extruder, and the residence time (including the extruder section) amounted from 4 min. to 12 min. Allyltriphenyl phosphonium bromide was used as the catalyst in all cases. The results which were thereafter measured on the pellets are summarized in the following:

| Example Number | EC weight % | Duration min. | Catalyst ppm | PET-Pellets I.V. dl/g | COOH meq/kg | b-value |
|---|---|---|---|---|---|---|
| 14 | 1.2 | 12 | 96 | 0.585 | 1 | 6.6 |
| 15 | 1.2 | 12 | 60 | 0.581 | 12 | 5.5 |
| 16 | 1.2 | 4 | 96 | 0.607 | 4 | 7.2 |
| 17 | — | 12 | — | 0.611 | 36 | 4.3 |

Examples 18 to 23 and Comparative Examples 24 to 26

Polyethylene terephthalate pellets with an I.V. of 0.616 dl/g, 29 meq/kg carboxyl end groups, and a b-value of 1.7, and containing 320 ppm of antimony and 15 ppm of phosphorus, were melted in an extruder and passed through a pipe/mixing system in accordance to examples 1 to 10, and connected to a downstream melt phase post-condensation reactor in accordance with the U.S. Pat. No. 5,055,273. The post-condensation was carried out at a constant agitator rotation speed of 3 RPM within 170 min. at 270° C. and approximately 1.0 mbar. The reactor with a discharge pump was connected to a second mixer section with 12 SMX elements (at an internal pipe diameter of 27.3 mm) closing with a circular aperture nozzle for strand formation and subsequent pelletizing.

Ethylene carbonate (EC) containing allyltriphenyl phosphonium bromide was fed into the intake area of the extruder and, in the examples 21 and 22, also at the beginning of the second mixing section. The temperature between the extruder and the circular aperture nozzle was uniformly 270° C., the pressure in the first mixing zone was approximately 35 bar and, in the second mixing zone, up to approximately 220 bar. The residence time between the first point of supply of EC and the entrance into the post-condensation reactor, amounted to 6 min. and, from the second feeding point of EC to the exit from the circular aperture nozzle was 10 min. The results which were thereafter determined on the pellets are summarized in the following:

| Example Number | 1st mixing zone EC weight % | 1st mixing zone Catal. ppm | 2nd mixing zone EC weight % | 2nd mixing zone Catal. ppm | PET Pellets I.V. dl/g | PET Pellets COOH meq/kg | b-value |
|---|---|---|---|---|---|---|---|
| 18 | 0.52 | 52 | — | — | 0.996 | 14 | 10.6 |
| 19 | 0.52 | 104 | — | — | 0.985 | 11 | 12.1 |
| 20 | 0.60 | 60 | — | — | 0.955 | 15 | 9.1 |
| 21 | 0.60 | 60 | 0.19 | 38 | 0.952 | 12 | 10.4 |
| 22 | 0.60 | 60 | 0.42 | 84 | 0.949 | 6 | 10.9 |
| 23 | 0.78 | 156 | — | — | 0.947 | 4 | 15.1 |
| 24 | 0.78 | 39 | — | — | 0.980 | 16 | 9.7 |
| 25 | 0.78 | — | — | — | 1.016 | 24 | 8.6 |
| 26 | — | — | — | — | 0.994 | 24 | 8.7 |

Examples 27 to 28 and 30 to 31, and Comparative Examples 29 and 32

Predried polybutylene terephthalate pellets (PBT) were melted in the manner described in examples 1 to 10, and reacted with ethylene carbonate containing allyltriphenyl phosphonium bromide. The temperature was 245° C., and the residence time from the feeding point of the ethylene carbonate up to the exit from the final circular aperture nozzle was 8 min. For the examples 27 to 28, and comparative example 29, polybutylene terephthalate (type C) produced by the direct esterification process, with an I.V. of 0.89 dl/g and 33 meq/kg of carboxyl end groups, and for the examples 30 to 31, as well as comparative example 32, polybutylene terephthalate (type D) produced by the transesterification process, with an I.V. of 1.06 dl/g and 18 meq/kg of carboxyl end groups was used. The results which were measured thereafter on the pellets are summarized in the following table:

| Example Number | PBT Type | EC weight % | Catalyst ppm | PBT Pellets | |
|---|---|---|---|---|---|
| | | | | COOH meq/kg | I.V. dl/g |
| 27 | C | 1.2 | 96 | 0 | 0.844 |
| 28 | C | 0.9 | 72 | 3 | 0.856 |
| 29 | C | — | — | 33.5 | 0.870 |
| 30 | D | 1.2 | 96 | 0.5 | 0.995 |
| 31 | D | 0.9 | 72 | 3.5 | 1.012 |
| 32 | D | — | — | 23.5 | 1.042 |

We claim:

1. A process for the reduction of the carboxyl end groups of a linear polyester which comprises
reacting said polyester in the melt phase with an alkylene carbonate in the presence of 40–160 ppm of allyltriphenyl phosphonium bromide, based upon the weight of said polyester.

2. The process of claim 1, in which said polyester is polyethylene terephthalate, or polybutylene terephthalate or polyethylene naphthalate, and said alkylene carbonate is ethylene carbonate.

3. The process of claim 1 in which said reaction of the polyester with alkylene carbonate takes place in a single stage, whereby the quantity of alkylene carbonate amounts to 0.5 to 1.5 weight %, and the quantity of allyltriphenyl phosphonium bromide amounts to 40 to 120 ppm, each based on the weight of the polyester.

4. The process of claim 1 in which said reaction of the polyester with alkylene carbonate takes place in two stages, whereby the quantity of alkylene carbonate amounts to 0.5 to 1.2 weight % in the first stage and 0.1 to 0.5 weight % in the second stage, and the quantity of allyltriphenyl phosphonium bromide amounts to 40 to 100 ppm in the first stage and 10 to 90 ppm in the second stage, the sum of the first and of the second stage being at the maximum equal to 160 ppm, each based on the weight of the polyester.

5. The process of claim 1 in which the reaction takes place within 2 to 12 min. per reaction stage.

6. The process of claim 3 which includes a polycondensation reaction after said single-stage reaction of the polyester with alkylene carbonate.

7. The process of claim 4 which includes a polycondensation reaction after said first stage and before said second stage of said reaction of the polyester with alkylene carbonate.

* * * * *